United States Patent [19]

Suchka

[11] 3,788,002
[45] Jan. 29, 1974

[54] SEEDLING TRAY INSERT

[75] Inventor: Michael B. Suchka, Clinton, Ohio

[73] Assignee: Lakeland Enterprises Inc., Lakeland, Fla.

[22] Filed: Mar. 13, 1972

[21] Appl. No.: 233,965

[52] U.S. Cl............... 47/34.13, 220/21, 229/28 R, 249/127

[51] Int. Cl......... A01g 9/02, B65d 1/36, B65d 5/48

[58] Field of Search......... 47/34.13; 229/28, 42, 29; 220/21, DIG. 12, DIG. 25; 249/127, 129

[56] References Cited
UNITED STATES PATENTS

| | | | |
|---|---|---|---|
| 1,910,396 | 5/1933 | Koppelman | 229/28 R |
| 3,447,261 | 6/1969 | Hundt | 47/34.13 |
| 3,386,607 | 6/1968 | Keene | 220/21 |
| 3,367,529 | 2/1968 | Welch et al | 220/21 |

Primary Examiner—Robert E. Bagwill
Assistant Examiner—Steven A. Bratlie
Attorney, Agent, or Firm—Nathaniel A. Humphries

[57] ABSTRACT

A collapsible insert for a seedling tray formed integrally from a single sheet of plastic material. The insert, in the folded position, has a plurality of adjacent parallel U-shaped channels each having a base with integrally folded sides. A plurality of integrally formed longitudinally spaced transverse dividers extend across each channel to form compartments therebetween. The sides of adjacent channels have the free longitudinal edge thereof integrally united for accordion folding. Pull tabs are provided on the edges of the farthest spaced sides. Upon removal of the folded insert from the tray and manual application of tension to the tabs, the sides of each channel fold open to become planar with the base and the dividers rotate with the sides about the folds, thus collapsing the compartments in each channel for enabling easy removal of seedlings.

3 Claims, 6 Drawing Figures

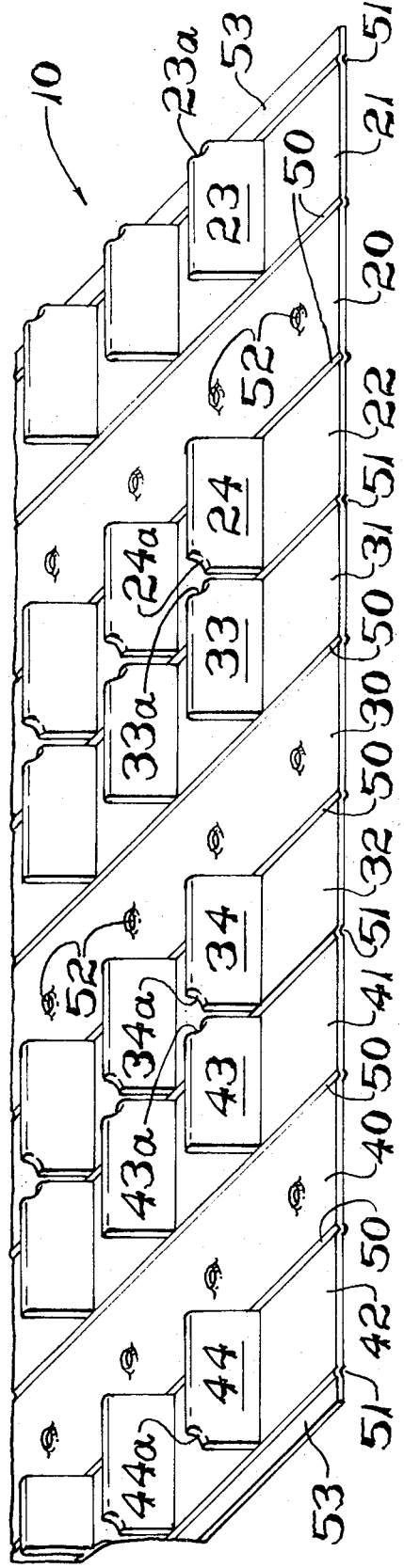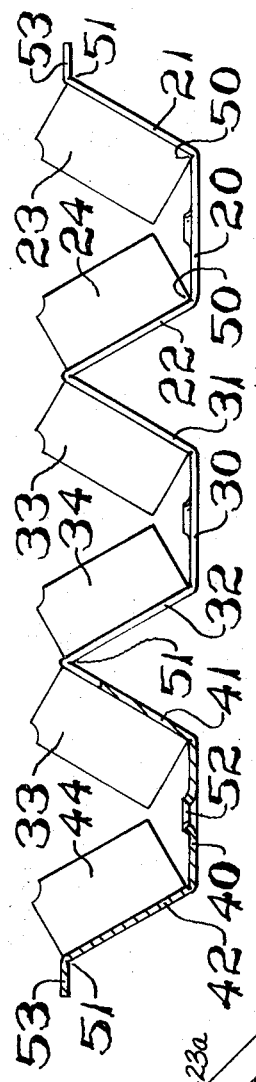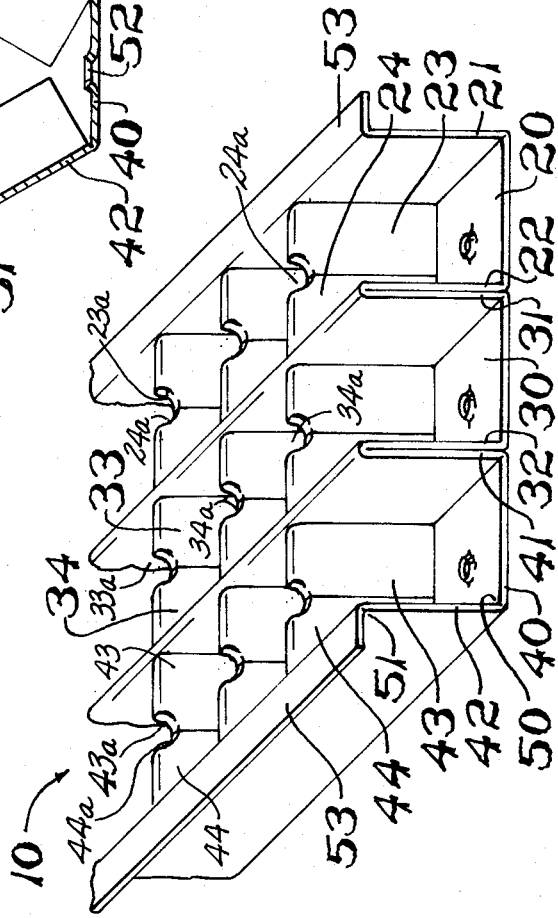

PATENTED JAN 29 1974 3,788,002
SHEET 2 OF 2
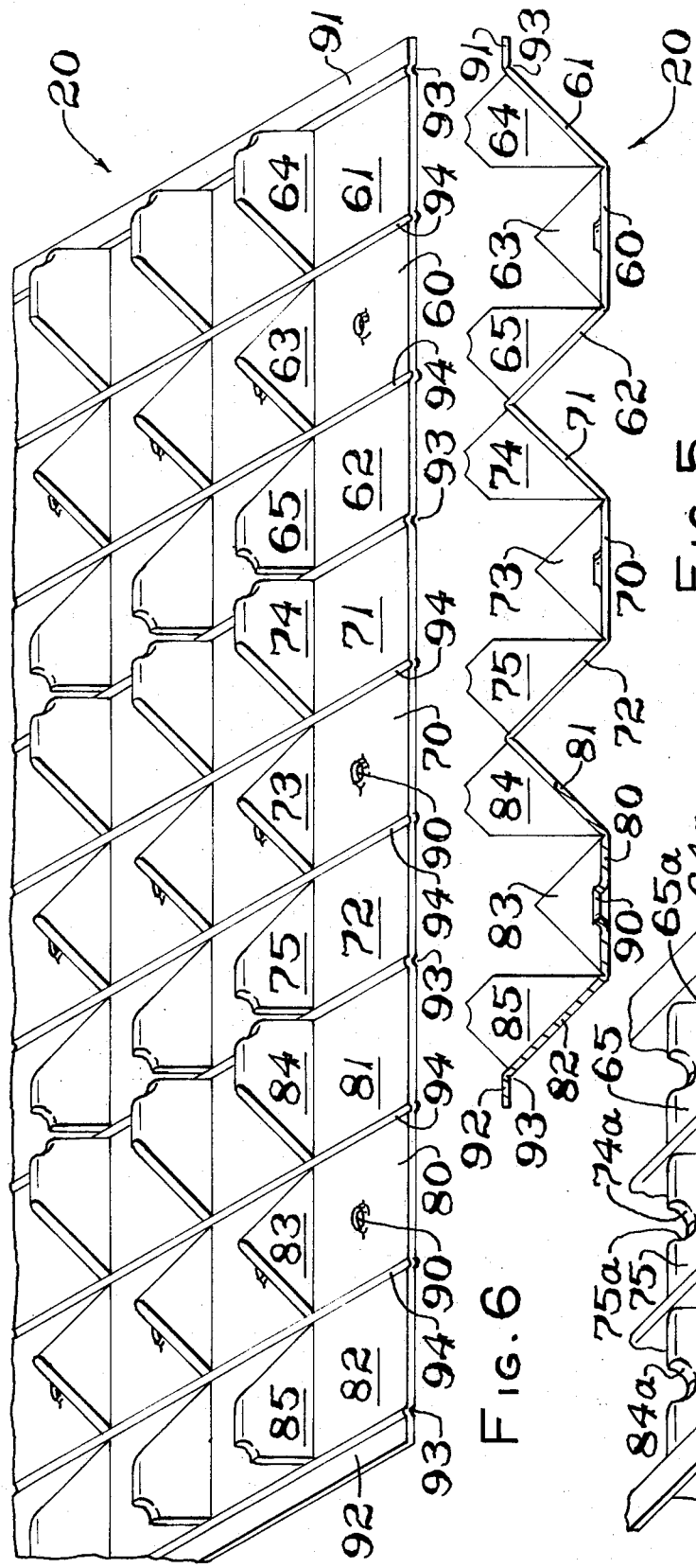
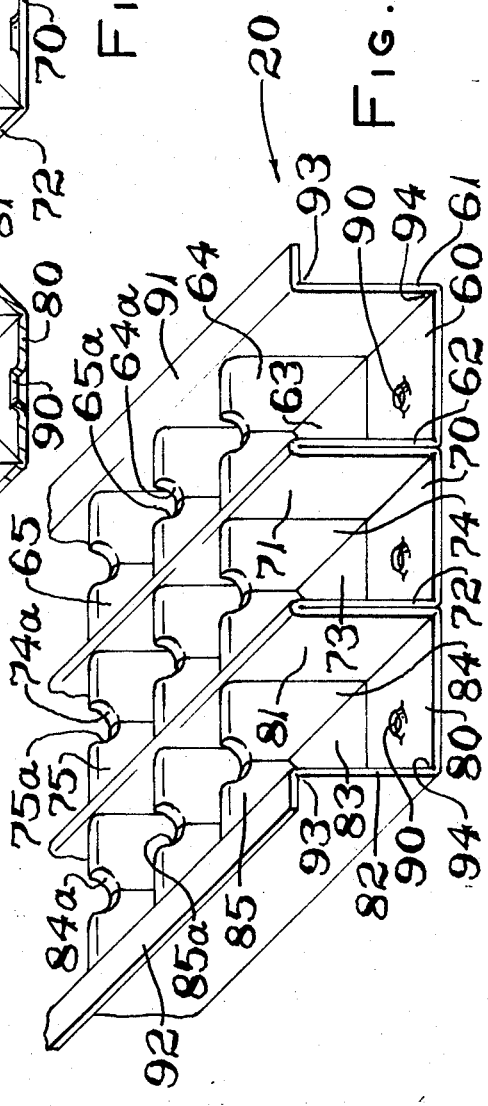
Fig. 4
Fig. 5
Fig. 6

SEEDLING TRAY INSERT

BACKGROUND OF THE INVENTION

In the nursery trade, it is common practice to plant seeds in shallow compartmentalized trays for germination and sprouting. These shallow trays are filled with potting soil which is kept in a moist condition until the sprouts from the seeds project through the surface of the soil. When the seed sprouts are of a desired height, or maturity, the seedlings or sprouts are then removed from the germination tray. Usually, the seedlings are removed from the soil manually by plucking or pulling the seedling with its roots from the soil by finger pressure. Manual removal of the seedlings from the soil often results in separation of the root structure from the seedling, and/or serious damage to the seedling which renders it incapable of further growth. Since removal of the entire root structure with the seedling is of paramount importance in transplanting a plant in its early stages of development, it has thus been desirable to find a seedling tray which will enable removal of the plants from the potting soil without damage to the roots.

Previous attempts to provide a seedling tray with a removable insert which would enable the seedling to be removed from the soil without damage, have utilized such expedients as a removable grid or single removable channels which could be opened by disengaging fasteners, such as locking tabs, to permit the insert to be opened for loosening the potting soil in each cavity about the roots of the seedling in that cavity. However, removal of the potting soil from a grid or individual channel is a time consuming and laborious task which necessarily limits the rate at which seedlings may be removed from the potting soil. Thus, it has long been desirable to find an insert for a seedling germinating tray which permits simultaneous rapid and easy loosening of the soil about each of a plurality of seedlings and thus enable rapid removal of the seedlings from the soil without concurrent damage to the root structure of the seedlings.

SUMMARY OF THE INVENTION

The present invention provides an insert for a seedling tray which is formed of a unitary sheet of plastic material having a sufficient number of cavities formed in the insert to permit germinating and rapid removal of the desired number of seedlings from each tray. The insert of the present invention includes a plurality of open or U-shaped channels arranged in longitudinally side-by-side arrangement with each channel having a base and integral foldable sides provided along the longitudinal edges of the base for forming the channel. Each channel of the insert has a plurality of openable dividers extending transversely across the channel from one side to the opposite side, with the dividers disposed in longitudinally spaced arrangement along the channel to thus form a plurality of cavities in the channel. Each of the dividers is openable, or capable of parting, at mid-channel so as to enable the entire insert, including the plurality of channels, to be opened by accordion folding of the sides of the channels and by parting and opening of the respective dividers. Pull tabs are provided on the free edges of the outer channel sides to enable the entire insert to be lifted from the seedling tray and extended to the unfolded condition by applying a tension force on the pull tabs. Thus, the present invention provides a seedling tray insert formed of a unitary sheet of plastic, which sheet is folded in an accordion manner to provide a plurality of channels in the insert with each channel having unfoldable transverse barriers to provide cavities in the channel so that the insert may be unfolded by extension. In the unfolded state, the dividers become separated so as to readily loosen the soil and permit easy removal of the seedlings from the loosened soil without damage to the roots thereof.

BRIEF DESCRIPTION OF THE DRAWINGS

FIG. 1 is an oblique view of the present form of the invention in the folded state as it would appear when mounted in a seedling tray or frame with the tray not shown for clarity;

FIG. 2 is an end view of the insert of FIG. 1 in the partially extended or partially unfolded state after removal from a tray;

FIG. 3 is an oblique view of the insert of FIG. 2 as it appears in the completely open or unfolded state with the sides and base of each channel in planar arrangement and with the dividers extending upright therefrom.

FIG. 4 is an oblique view similar to FIG. 1 showing the preferred form of the invention having each of the dividers formed in three pieces and integral with the insert;

FIG. 5 is a view similar to FIG. 2 and shows, in end view, the embodiment of FIG. 4 in the partially unfolded position; and, FIG. 6 is an oblique view similar to FIG. 3 and shows the insert of FIG. 4 in the completely unfolded state.

DETAILED DESCRIPTION

Referring now to FIG. 1, one form of the insert 10 is shown as having a plurality of base portions 20, 30, 40 disposed in transversely spaced longitudinally parallel planar arrangement, with the insert as illustrated in FIG. 1 being only a partial view and having only three base portions for convenience of illustration. Each of the base portions 20, 30, 40 has a side portion 21–22, 31–32, 41–42, respectively, attached along the longitudinal margins of the base portion with the respective side portions extending upwardly at substantially right angles to the base portions. Thus, each of the base portions and its associated side portion form an upwardly open U-shaped channel in transverse section.

The adjacent sides, as, for example, 22,31, of the adjacent base portions 20,30, have the free margins of the adjacent side portions integrally and foldably united such that the adjacent side portions extend in parallel back-to-back arrangement. Similarly, adjacent side portions 32 and 41, of respectively adjacent base portions 30,40, have the free margins of the side portions 32,41 integrally united and arranged in substantially parallel back-to-back arrangement. Thus, in the embodiment illustrated in FIG. 1, three U-shaped channels are united in longitudinally side-by-side parallel arrangement. Each of the channels formed by the respective base portions and adjoining side portions has a plurality of transverse barriers extending from one side of the channel to the opposite side of the channel at substantially right angles to the channel sides, with the transverse barriers extending from the base of the channel to the free margin of the channel sides.

Referring again to FIG. 1, the side portions 21, attached to base portion 20, have a plurality of dividers 23 formed integrally with the side portion 21 and extending therefrom at substantially right angles toward mid-channel, with the dividers 23 in longitudinally spaced arrangement along the side portion 21 of the channel. The side portion 22, integrally united along the opposite edge of base portion 20, also has a plurality of dividers 24 formed integrally with side portion 22 and extending at substantially right angles therefrom toward mid-channel, with the dividers 24 being arranged in longitudinally spaced arrangement along the side portion 22. The corresponding dividers on opposite side portions of the base portion 20 are arranged in pairs at common longitudinal stations such that individual opposite dividers 23 and 24 have their margins in mutual contact at mid-channel. The dividers are so shaped that the contact surface of the margins forms a seam extending preferably substantially perpendicularly from the base portion 20 of the channel. However, if desired, the seam may be oblique to the base portion.

Each of the dividers 23,24 has the portion of its margin adjacent the base portion in contact with the base portion such that the pair of dividers extending from respectively opposite sides of the channel form a continuous transverse barrier across the sides of the channel, extending from the base 20 of the channel to the free margins of the channel sides. In similar fashion, transverse barriers are provided to extend inwardly of the channel formed by base 30 and sides 31,32 with, respectively, dividers 33 extending from the side portion 31 and dividers 34 extending from the side portion 32 toward mid-channel. In like manner, the plurality of the dividers 43 extends inwardly toward mid-channel from the side portion 41 and dividers 44 extends from the side portion 43 of a channel formed by base portion 40 and sides 41,42.

Each of the dividers has a recess formed at the free edge of the margin in contact with the corresponding divider from the opposite side of the channel. In FIG. 1, the recesses are illustrated in the form of quadrants of a circle and bear the subscript "a" to the numeral designating the respective divider. For example, divider 23 has a quarter circle recess 23a formed in the upper margin at the juncture of the vertical margin in contact with the respective opposite divider 24, which has also quarter circle recess 24a formed respectively in its upper margin. The quarter circle 24a thus adjoins the quarter circle 23a of the opposite divider to form a semi-circular recess in the upper free margin of the two dividers when taken together. In like manner, recesses 33a,34a and 43a,44a are provided in the dividers of the remaining channels. In the presently preferred practice of the invention, the quarter circle recess 23a,24a, 33a,34a and 43a,44a each have a radius such that the semi-circular recess has a radius in the range of 3/32 to ⅛ of an inch.

The insert of FIG. 1 thus provides a plurality of open channels each having a plurality of cubicles or cavities formed therein between longitudinally spaced transverse barriers. Referring to FIG. 1, a typical cubicle is illustrated in the free end of each channel and each cubicle has a drainage hole provided in the base portion of the channel in each cubicle. In the presently preferred practice of the invention, each drain hole has a conically raised lip portion 52 extending upward of the base of the channel for retaining some moisture in the bottom of each cubicle.

Referring to FIG. 1, the side portions 21,42 extending from the end margins of the respectively farthest spaced base portions 20,40, each have a tab 53 formed integral with the free margin of each of the respective side portions 21,42. The tabs 53 extend outwardly of the channel from the side portions and at substantially right angles thereto in the folded condition, in the presently preferred form of the invention. Tabs 53 thus provide a gripping surface to enable easy removal of the insert 10 from the seedling tray and also permit the insert to be unfolded by exerting tension on the tabs 53. In the presently preferred practice of the invention, the tabs 53 extend the full length of the side portions of the channel. It will also be seen that the pull tabs 53 provided on the side portions of the farthest spaced channels, should have a transverse width sufficient that the tabs extend outwardly and over the thickness of the sides of the tray. The amount that the tabs extend over the tray sides is a matter of choice; however, in the presently preferred practice of the invention, it is desirable that the tabs extend at least ⅜ of an inch beyond the sides of the tray.

Referring now specifically to FIG. 2, the insert 10 is shown in the partially open or unfolded condition where the side portions of each channel are folded outwardly, thus pivoting the dividers attached to each side away from the base of each channel. The base portions 20, 30, 40 of each channel are moved transversely a greater distance from each other as unfolding occurs. As mentioned hereinabove, the unfolding may be readily accomplished by grasping the pull tabs 53 and exerting tension thereon.

Referring to FIG. 3, the insert is shown in the completely unfolded, or extended, configuration with the respective side portions and base portions of each channel in parallel planar configuration. In the unfolded condition, each of the divider portions extends vertically upward from the base and side portions with all of the dividers in spaced parallel relationship. It will readily be seen that when the insert 10 is in the unfolded state, as illustrated in FIG. 3, that the cavities formed between the dividers and the opposite side portions of each channel have been opened completely. The pivotal movement of the dividers about the fold or junction of the side portions with the base portion, causes a loosening of the potting soil which permits rapid and easy removal of each seedling from the soil without damage to the roots.

Referring again to FIG. 3, each channel has formed, at the juncture of the base portion with the respective side portions, a concave recess or groove extending the length of the channel. The grooves 50, at the juncture of the side portions with each base portion 21–20, 20–22, 31–30, 30–32, 41–40 and 40–42, are formed on the surface of the respective base portion which is the inner surface of the channel, or that surface of the base portion which will be in contact with the potting soil. The grooves 50 permit easy flexing and folding of the juncture of the side portions with the respective base portion to enable folding of the insert. Grooves or recesses 51 are also formed at the juncture of the margins of the respective side portions 22,31 and 32,41 of adjacent channels. Grooves 51 are also formed at the juncture of tabs 53 with side portions 21,42. The grooves 51 are formed in the sides of the side portions such that the groove 51 will be on the inner side of the fold between adjacent side portions of adjacent channels. The grooves 51, as mentioned hereinabove, permit easy folding of the margins between adjacent channel sides. In the presently preferred practice of the invention, when material in the range of 0.008 – 0.030 inches in thickness is used for the insert, each of the grooves or recesses 50,51 has a radius of substantially 1/64 of an inch.

It will be understood that the specific dimensions of the dividers, base portions and side portions are to be determined by the desired number of cavities for a given size potting tray. Although the size of the compartments and the number of channels utilized in the insert have a given size frame, it will be a matter of choice. However, in the presently preferred practice, for a standard potting tray having interior dimensions of 10 × 20½ × 2½ inches depth, each channel will be approximately 1.5 inches wide and the tray will contain seven channels having 10 compartments each. In the presently preferred practice of the invention, the number of channels per frame ranges from 2 – 12 for plastic sheet material thickness in the order of 1/64 of an inch. Preferably, the number of channels for this latter thickness material will be limited in the range 6 – 8 to provide an insert sufficiently rigid for easy handling. The number of compartments per channel is also a matter of choice; however, in the present practice of the invention, the number of compartments each may be formed conveniently in a channel having the dimensions described above ranging from 10 – 13 compartments per channel.

Referring now to FIG. 4, the preferred form of the invention is illustrated as having a plurality of U-shaped channels each formed by an integral base portion 60,70,80, respectively, positioned in laterally spaced parallel planar relationship. The insert 20 of FIG. 4 differs from the embodiment of FIG. 1 in that the preferred embodiment of FIG. 4 has transverse dividers extending across the sides of each channel in parallel longitudinally spaced relationship with each of the dividers being formed by three separable, or openable, pieces.

Each of the base portions 60,70,80 of FIG. 4 has a side portion integrally united respectively along spaced longitudinal margins of the respective base portion. The base 60 has side portions 61,62 integrally united respectively one on each opposite longitudinal margin thereof to thus form a generally U-shaped channel opening vertically upward. In similar manner, the base portion 70 has side portions 71,72 integrally united along the longitudinal margins thereof. The base portion 80 also has, respectively, side portions 81,82 integrally united along the longitudinal margins of the base portion 80 so as to form a generally U-shaped channel opening upward. The longitudinally free margins of the side portions 62,71 and 72,81 of adjacent channels are integrally united therealong in a hingeable or foldable manner such that the side portions and base portions form a continuous sheet of material. The side portions 61,82 of the channels spaced farthest apart each have a pull tab respectively 91,92 integrally united along the longitudinally free margin of the respective side portion 61,82. In the preferred form of the invention, the pull tabs extend at substantially right angles outward of the inside portions 61,82 as illustrated in FIG. 4 and in a manner similar to the pull tabs 53 of the embodiment of FIG. 1.

Each of the generally U-shaped channels formed by the bases 60,70,80 and their respective integrally united side portions has, as mentioned above, a plurality of transverse dividers extending between the side portions of each channel, from the base portion of the channel upward to the free margins of the side portion. As illustrated in FIG. 4, each of the transverse barriers is formed of three portions, with one portion triangular in shape extending vertically upward from the base portion and integrally united therewith. Referring to FIG. 4, the portion of the divider 63 is shown extending vertically upward from the base portion 60 with portions of the margins of divider portion 63 making oblique angles to the base portion 60. The side portion 61 of the respective channel having base portion 60, has a divider portion 64 integrally united with the inner wall of the side portion 61 and extending therefrom in substantially perpendicular arrangement toward mid-channel, with the lower margin of the divider portion 64 making an oblique angle with the portion 61 so that in the folded condition illustrated in FIG. 4, the side portion 64 has its lower margin in contact with the respective upper free margin of the divider portion 63. Referring specifically to FIG. 4, a divider portion 65 extends perpendicularly from the side portion 62 toward mid-channel with the lower margin of divider portion 65 in contact with the respective upper free margin of the divider portion 63 extending from the base of the channel. Each channel has the divider portions extending from opposite sides thereof in pairs at common longitudinal stations such that the pair of dividers extending from opposite sides of the channel have their margins at mid-channel position contacting the margins of the respective divider portion from the opposite side of the channel. The margin of divider portion 65 at mid-channel is thus in contact with the respective margin of the opposite divider portion 64. Thus, the three divider portions 63, 64,65 have their margins in contact in the region intermediate the side of the channel to form a continuous transverse barrier thereacross.

In similar fashion, divider portions 73,74,75 extend from the base 70 and side portions 71,72 of the next adjacent channel. The channel having base portion 80 also has divider portions of the same configuration 83,84,85 extending from the base portion 80 and the side portions 81,82 to form a continuous barrier across the channel formed therebetween.

Each of the dividers has a recess formed in the juncture of the upper margin and the vertical margin in mid-channel which recess permits cross drainage of liquid between the compartments formed by the longitudinally spaced barriers. As illustrated in FIG. 4, a typical divider 64 has a quarter circle recess 64a formed thereon and a quarter circle recess 65a formed respectively on the opposite divider portion 65 so that the quarter circle recesses 64a, 65a form a semi-circular recess in the upper free margin of the divider extending between the side portion 61,62 of the channel having base portion 60. In similar manner, recesses 74a, 75a and 84a,85a are formed respectively in the dividers extending between the sides of the channels having bases 70,80.

Each compartment formed by the base, side portions and transverse divider has a drainage hole 90 with a raised periphery formed in the respective base portion of the channel, as illustrated in FIG. 4, in the manner similar to the drainage holes 52 in the embodiment of FIG. 1.

Referring now to FIG. 5, the insert 20 of FIG. 4 is shown in the partially unfolded state similar to the embodiment of FIG. 1, illustrated in FIG. 2. In the partially unfolded configuration of FIG. 5, the insert 20 has the side portion divider 64,65 and 74,75 and 84,85 rotated about the juncture of the side portions and the bases respectively such that the dividers are pulled away from the base portions of the dividers 63,73,83 respectively and the side portions between adjacent channels 62,71 and 72,81 are unfolded in accordian fashion such that the base portions 60,70,80 are moved transversely a distance further apart. In the presently preferred practice of the invention, the insert 20 is formed of a single sheet of plastic material vacuum formed over a mold and, therefore, it is desirable to vacuum form the insert in the partially unfolded state as illustrated in FIG. 5. Where vacuum forming of a single sheet is used, each of the divider portions of the embodiment of FIG. 5 will thus be formed by plastic material flowing into a cavity in a mold and, therefore, each of the divider portions will have a hollow portion on the interior thereof. However, the present invention is not limited to a particular method of forming a plastic material and other means may be employed, as, for example, molding, in which case the divider portions will not necessarily have a hollow configuration.

Referring now to FIG. 6, the insert of FIG. 4 is shown in the completely unfolded state as it appears when the insert has been removed from a seedling tray and fully extended for loosening of the soil. In the completely unfolded state, the base, side portions and pull tabs 91,92 are in mutually planar configuration with the divider portions extending vertically upward therefrom. FIG. 6 clearly illustrates the recesses formed in the sheet material for aiding in folding of the integral side and base portions, as, for example, the recesses 94 formed longitudinally along the juncture of side portions 61,62 and base portion 60. In similar fashion, longitudinal recesses 94 are formed at the juncture of side portions 71,72 with their respective base portion 80. Recesses 94 are thus formed on a common side of the sheet material corresponding to the inner surface of the channels, or the surface to be in contact with the potting soil. Recesses 93 are formed on the opposite surface of the side portions, that is, the portion away from the soil, at the longitudinal juncture of the pull tabs 92 with respectively side portions 61,82, and at the juncture of the side portions between adjacent channels, respectively side portions 62,71 and 72,81. When the insert 20 is molded in the configuration illustrated in FIG. 5, the recesses 93 and 94 will be provided at the corresponding juncture of the longitudinal margins of the respectively adjacent side and base portions; however, for clarity of illustration, the recesses 93 and 94 have not been illustrated in FIG. 5. Recesses 93 and 94 are similar in configuration and dimensions to the recess 51,50 of the embodiment of FIG. 3. Referring again to FIG. 5, the details of a drainage hole 90 are shown in a broken-away portion of base 80 in the form of the base portion wherein the sides of the drainage hole are chamfered upward into the channel in a manner similar to the drainage holes 52 in the embodiment of FIG. 1.

The present invention thus provides an insert for a seedling tray having a plurality of compartments for germinating the seeds of separate plants. The insert of the present invention may be readily lifted from the seedling tray, when the seeds have sprouted and are ready for transplantation, by grasping pull tabs provided to extend over the edges of the tray and lifting the entire insert from the tray. When the insert has thus been removed from the seedling tray, the insert may be broken free of the soil in each compartment, again grasping the pull tabs provided along the outer margins of the insert and applying tension to the pull tabs and extending the insert outwardly by virtue of accordion-like unfolding until the sides and dividers of the compartments of the insert are opened completely in planar arrangement. The present invention thus provides an insert for a seedling tray which may be readily made from a single sheet of plastic material and which permits easy removal of the insert from the tray and freely loosens the soil about each seedling such that the seedling may be removed from the soil without damage to the root structure of the plant.

Modifications and variations of the present invention will be apparent to those having ordinary skill in the art and the invention is limited only by the following claims.

I claim:

1. An insert for a seedling tray comprising:
   a. a plurality of base portions of elongated configuration with each base portion having spaced opposite longitudinal base margins;
   b. a plurality of side portions of generally elongated configuration with each of said base margins having a longitudinal margin of one of said side portions integrally and hingedly united therewith for movement of said side portion between an unfolded position parallel to and a folded position at generally right angles to said base portion, in which folded position each of said base portions with its respectively integral side portions forms a generally U-shaped channel, and the adjacent side portions of respectively adjacent base portions have the free longitudinal margins of said side portions integrally and hingedly united such that said adjacent side portions are folded in substantially parallel back-to-back arrangement in the said folded position; and
   c. a plurality of openable divider means formed integrally with said side portions and extending substantially perpendicularly therefrom in longitudinally spaced arrangement, such that when the side portions are in said folded position, said divider means provide spaced transverse barriers between the base and sides of each of said U-shaped channels for forming a plurality of cavities therebetween and in the said open position, the said side portions and base portions are in integral coplanar arrangement with each of said divider means completely opened and substantially perpendicularly therefrom wherein said divider means includes first portions extending inwardly of the channel from each of said side portions with said first portions arranged in pairs on opposite sides of each of said channels with the individual members of each of said pairs disposed at a common longitudinal station with portions of the margins of the members of each pair in mutual contact at mid-channel; and second portions formed integrally with each of said base portions extending substantially perpendicularly therefrom in longitudinally spaced parallel relationship at longitudinal stations corresponding with each pair of said first portions, with each of said second portions having portions of the margins thereof contacting portions of the margin of each member of the corresponding pair of said first portions.

2. The insert defined in claim 1, wherein the portions of the margins of each of said first portions in mutual contact at mid-channel form a parting line substantially perpendicular to the corresponding base portion, and each of said second portions has the portions of the margins thereof contacting said first portions forming a parting line making an oblique angle to the corresponding base portion.

3. The insert defined in claim 2, wherein each of said second portions has a substantially planar triangular configuration with the base of said triangle formed integral with the corresponding base portion of the channel and with the apex of said triangle coincident with the said parting line perpendicular to said base.

* * * * *